July 14, 1964 K. WARTENBERG 3,140,966
VAPOR DEPOSITION ONTO STACKED SEMICONDUCTOR WAFERS
FOLLOWED BY PARTICULAR COOLING
Filed July 11, 1962
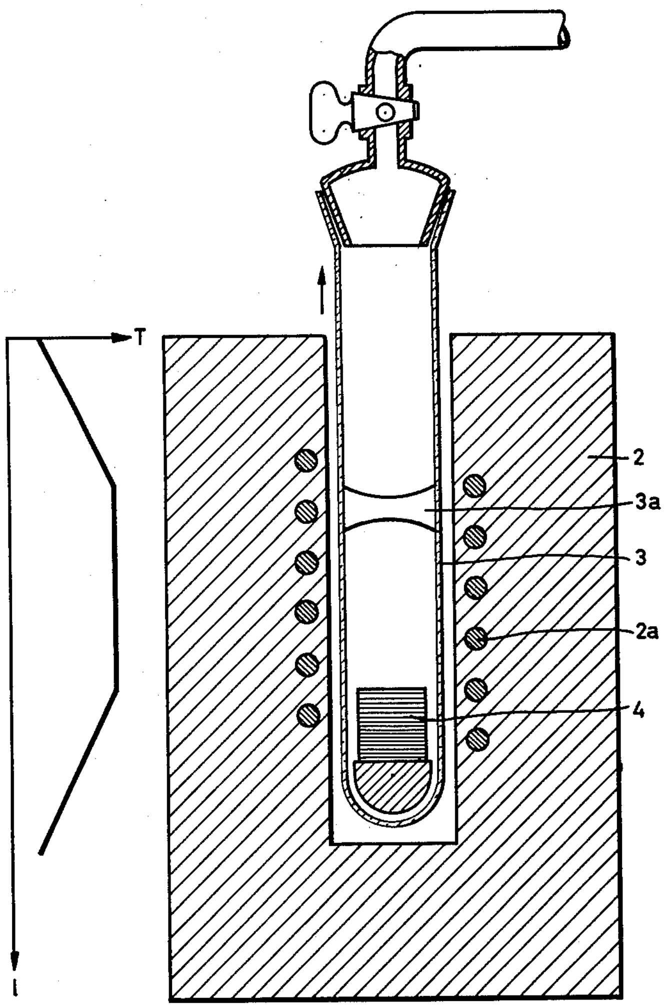

United States Patent Office 3,140,966

Patented July 14, 1964

3,140,966

VAPOR DEPOSITION ONTO STACKED SEMICONDUCTOR WAFERS FOLLOWED BY PARTICULAR COOLING

Klaus Wartenberg, Erlangen, Germany, assignor to Siemens-Schuckertwerke Aktiengesellschaft, Berlin-Siemensstadt, Germany, a corporation of Germany Filed July 11, 1962, Ser. No. 209,489
Claims priority, application Germany May 29, 1962
3 Claims. (Cl. 148—175)

My invention relates to a method according to application Serial No. 205,740 of K. Reuschel, filed on even date herewith, and concerns an improvement thereof.

The copending coassigned application discloses a method for the production of electronic semiconductor devices having a monocrystalline semiconductor body with two or more layers of different electric conductance properties, namely respectively different types of conductance or respectively different dopant concentration and hence ohmic resistances. The devices are produced by monocrystalline precipitation of semiconductor material from gaseous halogen compounds of the semiconductor material upon a substratum or carrier member of semiconductor material having the same crystalline lattice structure, the carrier member being heated during the process. More specifically, the process is performed by stacking semiconductor discs of respectively different conductance types or different dopant concentration alternately upon each other within a closable vessel, and then producing, in the presence of a reaction medium that forms gaseous compounds with the semiconductor material, a temperature gradient from one end to the other of the rod-shaped stack of semiconductor members.

The above-mentioned stack of semiconductor disc members is preferably located in an elongated vessel, for example a quartz tube, which is heated by an electric furnace for example of the resistance-heater type. By producing a temperature gradient within the furnace itself or by slowly moving the tubular vessel with its contents out of the furnace, the desired temperature gradient in the elongated stack of semiconductor members can be adjusted.

My invention has as an object the improvement of the above-described method with respect to uniformity of the resulting properties of the semiconducor devices. This is accomplished by arranging the elongated stack in a vertical direction and producing the temperature gradient in a manner so that it is directed downwardly along the stack from above.

I have found that the migration of the semiconductor material from one semiconductor disc to the adjacent one occurs in dependence upon the position and arrangement of the disc members. Apparently this can be explained by the fact that a flow of the gaseous reaction medium occurs within the vessel and that such flow has the tendency to promote or impede the elimination and the growth of the semiconductor material at individual localities. Thus, with a vertical direction of an elongated vessel with a rod-shaped stack of semiconductor discs located therein, a non-uniform elimination of material exhibiting itself by pit formation or eating-away at singular localities occurs near the edge of the material-issuing side of the semiconductor discs when the temperature gradient is oriented from below toward the top of the stack as is the case with the equipment and procedure described in the above-mentioned copending application, the pertinent portions of which are incorporated herein by reference. However, when the semiconductor stack is arranged in accordance with the present invention and the temperature gradient is set to a curve from above toward the bottom of the stack, then apparently no thermal motion of the reaction gases takes place because the gas zones or layers correspond to the orientation of the temperature gradient in the stack. That is, the warmer gases are located at the upper end of the closed processing vessel and the colder gases at the lower end thereby preventing any possible convective motion. I have found that, as a consequence, the precipitation takes place much more uniformly over the entire surface of the individual semiconductor discs, so that the invention considerably contributes to improved performance and results of the process.

The invention will be further described with reference to an embodiment of processing equipment and an appertaining explanatory diagram shown by way of example on the accompanying drawing.

The drawing shows a furnace 2, such as an electric resistance furnace, with a heater winding 2*a*, in which a quartz tube 3 is arranged. A stack of semiconductor discs 4 is located inside the quartz tube 3. The quartz tube protrudes partly out of the furnace 2 for the purpose of being properly supported and held in position.

The heater winding 2*a* of the furnace 2 is arranged at about the middle portion of the furnace. This has the consequence that the temperature profile occurs within the tubular heating space of the furnace as is shown in the diagram at the left of the furnace 2. The diagram shows the temperature T plotted over the axial length L of the furnace. In the middle of the furnace there exists a region having an approximately uniform temperature, whereas the temperature declines about linearly toward the top and toward the bottom of the furnace space. After the semiconductor bodies 4 are stacked into the quartz tube 3 and after the tube is filled with the reaction gas, the tube space is fused off at about the middle of its length, namely at the location 3*a*. The quartz tube is then placed into the furnace in such a position that the fusion locality 3*a* is situated in the region of the uniform temperature. The semiconductor disc members 4 are then located in the range of the lower heat gradient so that thermal motion of the reaction gas is virtually fully prevented.

The semiconductor discs may consist for example of silicon of alternately opposed conductance characteristics, that is of different dopant types or concentrations. In the instant example thirteen semiconductor bodies, having a disc thickness of about 300 to 400$\mu$, a diameter of about 18 mm. and of alternating p and n conductance types were stacked upon each other. The length of the stack was about 10 mm. The inner space of the quartz tube 3 in this case is preferably filled with a mixture of silicon tetrachloride and hydrogen in the ratio 1:10. The heat gradient from the upper to the lower end of the semiconductor stack for this purpose can be adjusted to 50° C. For example, the upper end of the semiconductor stack is kept at a temperature of 1190° C., whereas the temperature at the lower end of the stack is 1140° C. After heat treatment of about 13 minutes' duration, the quartz tube 3 is rapidly pulled out of the furnace 2 in order to freeze the discs in the condition obtained by the heat treatment. It was essential that the surrounding atmosphere in the enclosed space did not contain oxygen, nitrogen or water vapor which otherwise would result in the formation of oxides and nitrides at the surface of of the semiconducting bodies producing masking effects which would result in a non-uniform removal and transference of material.

I claim:

1. The precipitation method of producing electronic semiconductor devices having a monocrystalline semiconductor body with a plurality of monocrystalline layers of respectively different electric conductance properties, which comprises vertically stacking in a sealable vessel a multiplicity of plate members having alternately different respective conductance properties upon each other to form an axially elongated stack, said members consisting of semiconductor monocrystals of substantially the same lattice structure as the semiconductor substance to be precipitated; subjecting the stack in the vessel to a reaction gas which contains a halogen compound of semiconductor substance to be precipitated; heating the stack in the presence of the reaction gas to precipitation temperature, to produce a temperature gradient from one end of the stack to the other with the higher temperature near the top of the stack.

2. The precipitation method of producing electronic semiconductor devices having a monocrystalline semiconductor body with a plurality of monocrystalline layers of respectively different electric conductance properties, which comprises vertically stacking in a sealable vessel a multiplicity of plate members having alternately different types of conductance upon each other to form an axially elongated stack, said members consisting of semiconductor monocrystals of substantially the same lattice structure as the semiconductor substance to be precipitated; subjecting the stack in the vessel to a reaction gas which contains a halogen compound of semiconductor substance to be precipitated; heating the stack in the presence of the reaction gas to precipitation temperature, to produce a temperature gradient from one end of the stack to the other with the higher temperature near the top of the stack.

3. The precipitation method of producing electronic semiconductor devices having a monocrystalline semiconductor body with a plurality of monocrystalline layers of respectively different electric conductance properties, which comprises vertically stacking in a sealable vessel a multiplicity of plate members having alternately different dopant concentrations upon each other to form an axially elongated stack, said members consisting of semiconductor monocrystals of substantially the same lattice structure as the semiconductor substance to be precipitated; subjecting the stack in the vessel to a reaction gas which contains a halogen compound of semiconductor substance to be precipitated; heating the stack in the presence of the reaction gas to precipitation temperature, to produce a temperature gradient from one end of the stack to the other with the higher temperature near the top of the stack.

References Cited in the file of this patent

O'Rourke et al.: "Electrical Properties of Vapor Grown Ge Junctions," I.B.M. Journal of Research and Development, vol. 4, No. 3, July 1960, pages 256–258.

Loonam: "Principles and Applications of the Iodide Process," Journal of the Electrochemical Society, vol. 106, No. 3, March 1959, pages 238–244.